US011861078B2

(12) United States Patent
Kamiyama

(10) Patent No.: US 11,861,078 B2
(45) Date of Patent: *Jan. 2, 2024

(54) ELECTRONIC PEN CENTRAL ROD AND ELECTRONIC PEN MAIN BODY PART

(71) Applicant: Wacom Co., Ltd., Saitama (JP)

(72) Inventor: Ryoji Kamiyama, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,297

(22) Filed: Dec. 6, 2022

(65) Prior Publication Data

US 2023/0214029 A1 Jul. 6, 2023

Related U.S. Application Data

(63) Continuation of application No. 17/706,794, filed on Mar. 29, 2022, now Pat. No. 11,531,410.

(30) Foreign Application Priority Data

Apr. 30, 2021 (JP) ................................. 2021-077639

(51) Int. Cl.
*G06F 3/0354* (2013.01)
*G06F 3/044* (2006.01)

(52) U.S. Cl.
CPC .......... *G06F 3/03545* (2013.01); *G06F 3/044* (2013.01)

(58) Field of Classification Search
CPC ............................. G06F 3/03545; G06F 3/044
See application file for complete search history.

(56) References Cited

U.S. PATENT DOCUMENTS

| 10,114,483 | B2 | 10/2018 | Aoki et al. |
| 10,372,241 | B2 | 8/2019 | Aoki et al. |
| 2011/0219892 | A1 | 9/2011 | Fukushima et al. |
| 2013/0199311 | A1 | 8/2013 | Horie et al. |
| 2014/0111488 | A1 | 4/2014 | Michihata et al. |
| 2014/0327657 | A1 | 11/2014 | Huang |
| 2017/0102792 | A1 | 4/2017 | Aoki et al. |
| 2022/0050536 | A1 | 2/2022 | Kamiyama et al. |

FOREIGN PATENT DOCUMENTS

| JP | 2011-186803 A | 9/2011 |
| JP | 2013-161307 A | 8/2013 |
| WO | 2016/185915 A1 | 11/2016 |
| WO | 2020/235342 A1 | 11/2020 |

*Primary Examiner* — Michael Pervan
(74) *Attorney, Agent, or Firm* — Seed IP Law Group LLP

(57) ABSTRACT

An electronic pen central rod is provided. The electronic pen central rod includes a connection member having a front end and a back end, and a front-end member having a pen tip part and a back-end extension part that extends in an opposite direction from the pen tip part to be detachably held by the front end of the connection member with a first level of holding strength. The electronic pen central rod further includes a back-end member having an attachment part to be attached to an electronic pen interior and a front-end extension part that extends in an opposite direction from the attachment part to be held by the back end of the connection member with a second level of holding strength. The second level of holding strength is higher than the first level of holding strength.

20 Claims, 5 Drawing Sheets

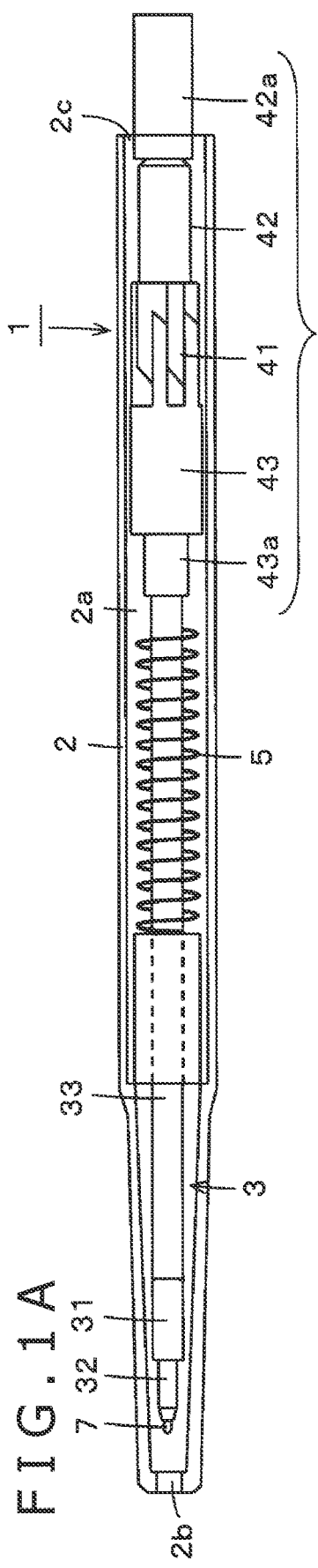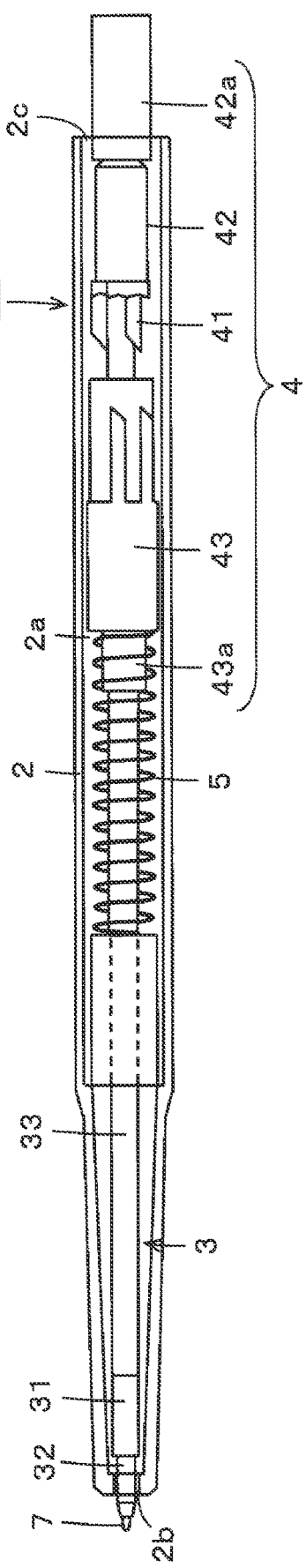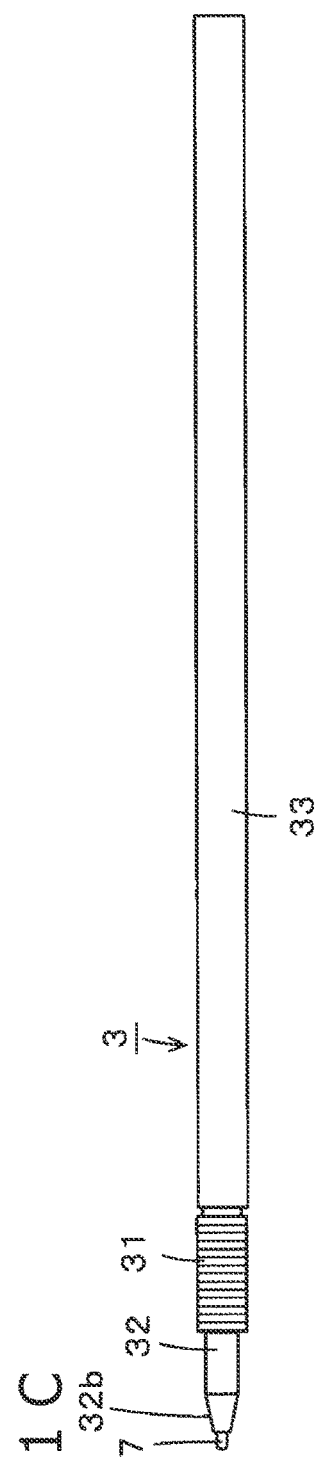

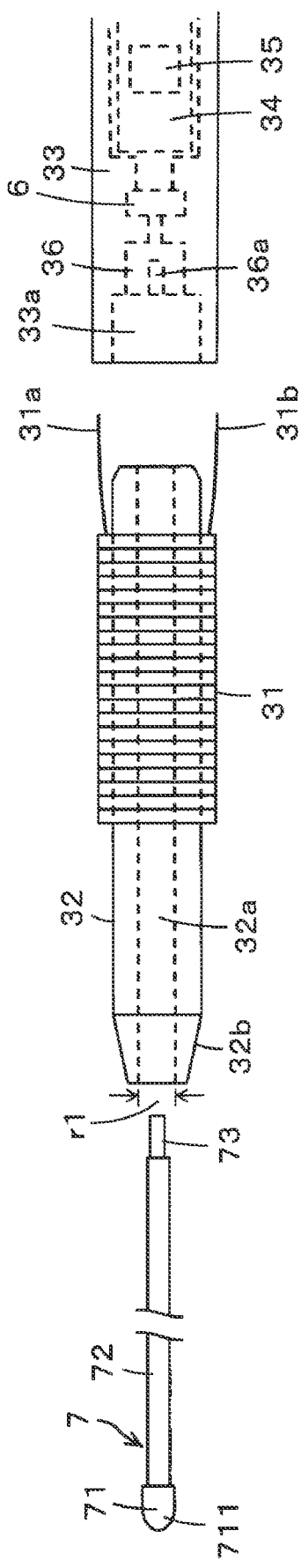
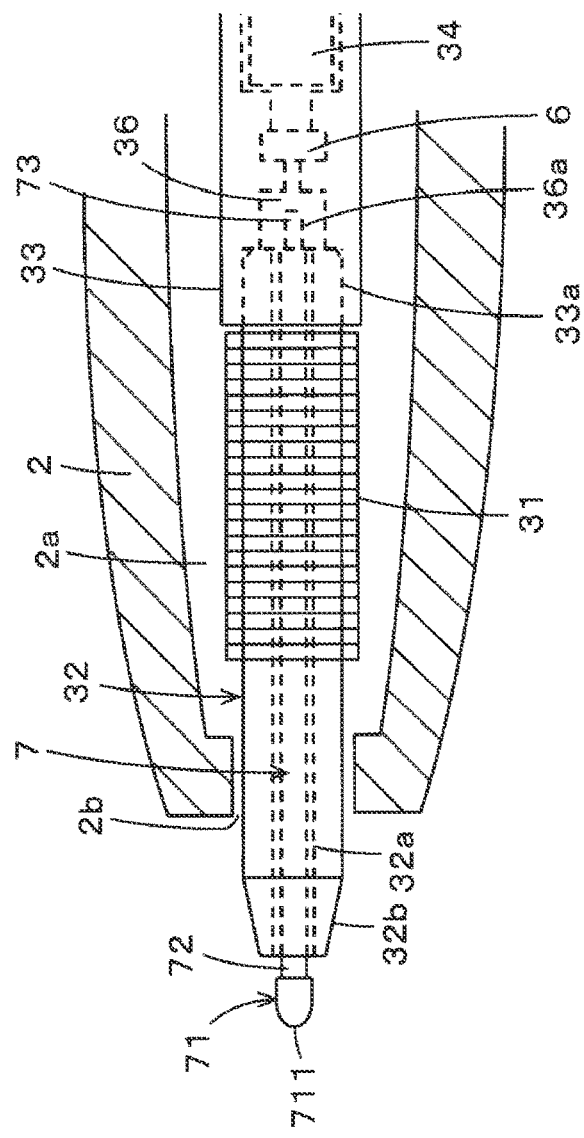
FIG. 2A
FIG. 2B

ELECTRONIC PEN CENTRAL ROD AND ELECTRONIC PEN MAIN BODY PART

BACKGROUND

Technical Field

The present disclosure relates to an electronic pen central rod and an electronic pen main body part configured by use of the electronic pen central rod.

Description of the Related Art

Some electronic devices such as smartphones and personal computers (PC) include a position detection device formed of a position detection sensor and a position detection circuit. Such electronic devices are widely used with an electronic pen functioning as an operating element that permits pointing input to the electronic device. Such electronic devices are made increasingly smaller and thinner in size and thickness, and so is the electronic pen that is made smaller and thinner. In order to make the electronic pen smaller and thinner, it is necessary to also make an electronic pen central rod smaller and thinner, which tends to reduce the strength of the electronic pen central rod.

WO 2016/185915 (Patent Document 1 hereunder) discloses an electronic pen central rod configured with a metal pipe part, to one end of which a resin pen tip part is press-inserted and secured, and to the other end of which a writing pressure transmission part made of resin is press-inserted and secured. WO 2020/235342 (Patent Document 2 hereunder) discloses an electronic pen central rod configured with a metal axial center forming part (pipe part), to one end of which a felt pen tip part is inserted and fitted, and to the other end of which a fitting part made of hard resin is inserted and fitted.

Each of the disclosed electronic pen central rods includes the metal pipe part to form a high-strength, hard-to-break electronic pen central rod. In the case of the electronic pen central rod disclosed in Patent Document 2, it is explained that the method of coupling the metal axial center forming part (pipe part) with the pen tip part and with the fitting part entails use of adhesives. It is also explained that, in a case where the axial center forming part is made of hard resin, fusion bonding is used.

In the case of the electronic pen central rod disclosed in Patent Document 1, both the pen tip part and the writing pressure transmission part are press-inserted into the pipe part, and the strength of the connection between these components is not high. There is a possibility that, when the pen tip part is strongly pressed, for example, against an operation surface to be used, the pen tip part may be detached or dislodged. On the other hand, in the case of the electronic pen central rod disclosed in Patent Document 2, because the pen tip part and the fitting part are bonded by adhesive to the pipe part, it is difficult to remove the pen tip part from the pipe part to replace only the pen tip part. Also, the manufacturing process of the electronic pen central rod tends to be time consuming.

In order to make the electronic pen central rod smaller and thinner as described above, it is preferable that the overall strength of the central rod be ensured while the manufacturing process of the central rod is made as simple as possible. Furthermore, the usability of the electronic pen central rod is desired to be improved by making the pen tip part (front-end forming part) easily replaceable or by reducing the physical load applied to a portion at which the central rod is attached to the electronic pen. That is, in the case of the electronic pen that permits detection of writing pressure, the electronic pen central rod is configured to apply pressure to a writing pressure detection part, and if the writing pressure detection part and the electronic pen central rod are frequently connected to or disconnected from each other, the connecting portion therebetween can be worn out or deformed so as to affect the detection of writing pressure.

BRIEF SUMMARY

The present disclosure has been made in view of the above circumstances. An aspect of the disclosure is directed to providing an electronic pen central rod which has high strength, withstands rough use, permits easy replacement of a pen tip part, and has a high affinity with an electronic pen to which the central rod is attached.

In solving the above problem and according to one embodiment of the present disclosure, there is provided an electronic pen central rod including a front-end member configured as a rod-like body having a pen tip part and a back-end extension part that extends from a back-end face of the pen tip part in an opposite direction of the pen tip part, a back-end member configured as a rod-like body having an attachment part to be detachably attached to an electronic pen interior and a front-end extension part that extends from a front-end face of the attachment part in an opposite direction of the attachment part, and a connection member configured as a rod-like body having two end sides, one of the two end sides being provided with a front-end hole part into which the back-end extension part of the front-end member is inserted, the other end side being provided with a back-end hole part into which the front-end extension part of the back-end member is inserted. An engagement portion between the back-end extension part of the front-end member and the connection member is provided with a front-end holding part that detachably holds the inserted back-end extension part of the front-end member with a predetermined level of holding strength, and an engagement portion between the front-end extension part of the back-end member and the connection member is provided with a back-end holding part that holds the inserted front-end extension part of the back-end member with a predetermined level of holding strength. The predetermined level of holding strength between the back-end hole part and the front-end extension part is made higher than the predetermined level of holding strength between the front-end hole part and the back-end extension part.

In the electronic pen central rod outlined above, the engagement portion between the back-end extension part of the front-end member and the connection member is provided with the front-end holding part that detachably holds the back-end extension part of the front-end member, which is inserted through the front-end hole part into the connection member, with the predetermined level of holding strength. The engagement portion between the front-end extension part of the back-end member and the connection member is provided with the back-end holding part that holds the front-end extension part of the back-end member, which is inserted through the back-end hole part into the connection member, with the predetermined level of holding strength. The holding strength between the back-end hole part and the front-end extension part is made higher than the holding strength between the front-end hole part and the back-end extension part.

Consequently, both the front-end member and the back-end member can be attached to and held by the connection member with the predetermined levels of holding strength. This provides a high-strength electronic pen central rod that is robust, that permits easy replacement of the front-end member, and that can properly be attached to and detached from an electronic pen via the back-end member.

BRIEF DESCRIPTION OF THE SEVERAL VIEWS OF THE DRAWINGS

FIGS. 1A to 1C are views each explaining a configuration example of an electronic pen according to the present disclosure;

FIGS. 2A and 2B are enlarged views each explaining a configuration example of an electronic pen main body part having an electronic pen central rod according to the present disclosure;

DETAILED DESCRIPTION

Figure 3A:
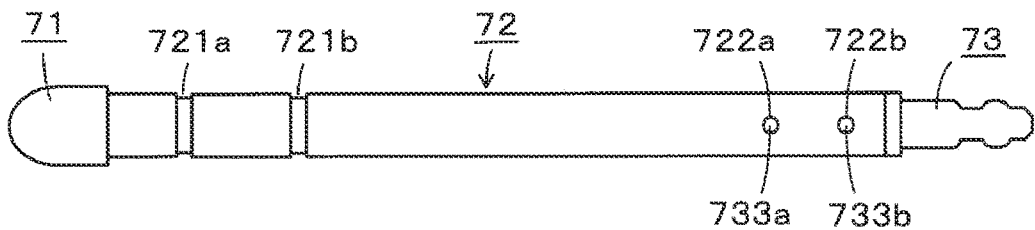
FIGS. 3A to 3F are views each explaining a configuration example of the electronic pen central rod according to the present disclosure.

Described below with reference to the accompanying drawings are embodiments of an electronic pen central rod according to the present disclosure along with embodiments of an electronic pen according to this disclosure. The electronic pen embodying the invention and explained hereunder constitutes an exemplary electronic pen that supports position pointing based on coupling with a position detection device via electromagnetic induction.

Configuration Example of the Electronic Pen 1

FIGS. 1A to 1C are views each depicting a configuration example of an electronic pen used in conjunction with an electronic pen central rod. An electronic pen 1 of this embodiment houses an electronic pen main body part 3 inside a hollow part 2a of a cylindrical housing 2. The electronic pen 1 has a knock cam mechanical part 4 with a knock mechanism by which the pen tip side of the electronic pen main body part 3 is extended and retracted through an opening 2b at one end of the housing 2 in the longitudinal direction. In this embodiment, the electronic pen main body part 3 has a configuration of a cartridge type, which allows for its attachment to and detachment from the housing 2. The electronic pen main body part 3 includes an electronic pen central rod (simply referred to as the central rod hereunder) 7 embodying the present disclosure. The central rod 7 can be attached to and detached from the electronic pen main body part 3. In the example of FIGS. 1A and 1B, the housing 2 of the electronic pen 1 is formed with a transparent synthetic resin, so that the inside of the housing 2 is visible.

The electronic pen 1 of this embodiment is configured to be interchangeable with a commercially available knock type ballpoint pen. The housing 2 and the knock cam mechanical part 4 disposed therein have substantially the same configurations and dimensions as those of their counterparts of a well-known commercially available knock type ballpoint pen. As depicted in FIGS. 1A and 1B, the knock cam mechanical part 4 has a well-known configuration that includes a cam body 41, a knocking rod 42, and a rotator 43 in combination.

In the state of FIG. 1A, pressing an end part 42a of the knocking rod 42 causes the knock cam mechanical part 4 to lock the electronic pen main body part 3 into the state of FIG. 1B inside the housing 2. In this state, the pen tip side of the electronic pen main body part 3 projects from the opening 2b of the housing 2. In the state of FIG. 1B, again pressing the end part 42a of the knocking rod 42 causes the knock cam mechanical part 4 to unlock the electronic pen main body part 3. A return spring 5 brings the electronic pen main body part 3 back to its position in the housing 2 in the state of FIG. 1A. The detailed configurations and operations of the knock cam mechanical part 4 are well known and will not be discussed further.

Configuration Example of the Electronic Pen Main Body Part 3

FIG. 1C is a view depicting a configuration example of the electronic pen main body part 3. FIGS. 2A and 2B are partially enlarged views explaining how the pen tip side of the electronic pen main body part 3 is configured. In the electronic pen main body part 3 of this embodiment, as depicted in FIG. 1C, a magnetic material core, which is a ferrite core 32 in this example and about which a coil 31 is wound, is coupled with a cylindrical part 33. The central rod 7 is inserted into a through-hole (not depicted in FIG. 1C) of the ferrite core 32 and attached detachably to a writing pressure detection part 6 (not depicted in FIGS. 1A to 1C; see FIGS. 2A and 2B) disposed in the cylindrical part 33, thereby forming a portion of the electronic pen main body part 3. As depicted in FIGS. 1C and 2B, the central rod 7 has the end part of the pen tip side projected from the ferrite core 32.

As depicted in FIG. 2A, the ferrite core 32 of this example is made of, for example, a cylindrical ferrite material which has a through-hole 32a formed in the axial direction thereof, the through-hole 32a having a predetermined diameter r1 (e.g., r1=1 mm) and allowing the central rod 7 to be inserted. The ferrite core 32 has a tapered part 32b formed on the pen tip side, the tapered part 32b gradually being tapered toward the pen tip side. The tapered part 32b is configured to provide stronger magnetic coupling with a sensor of the position detection device than if there is no tapered part 32b. The central rod 7 is made up of a front-end member 71, a connection member 72, and a back-end member 73, as will be discussed later in detail.

In this embodiment, as depicted in FIG. 2A, the winding position of the coil 31 over the ferrite core 32 is located disproportionately toward the opposite side of the pen tip side and covers approximately half the total length of the ferrite core 32. A portion ranging from the end part of the ferrite core 32 on the pen tip side to one end of the coil wound part constitutes a coil unwound part with no coil wound thereon.

Near the portion of the cylindrical part 33 that couples with the ferrite core 32, the writing pressure detection part 6 is provided. In this example, the writing pressure detection part 6 is configured by use of a semiconductor element that varies in capacitance according to writing pressure, as disclosed in JP 2013-161307 A. Alternatively, the writing pressure detection part 6 can also be configured with a variable capacitance capacitor whose capacitance varies according to writing pressure by use of writing pressure detecting section with a known mechanical configuration disclosed in JP 2011-186803 A.

The writing pressure detection part 6 is configured to be pressed by a pressure transmission member 36 fitted with the back-end member 73 of the central rod 7. The pressure transmission member 36 has a fitting recessed part 36a. Fitting the back-end member 73 of the central rod 7 into the fitting recessed part 36a attaches the central rod 7 to the pressure transmission member 36. The pressure transmission member 36 is disposed in a manner not to be detached or dislodged from the inside the electronic pen main body part 3, but the pressure transmission member 36 may be pushed in and returned slidably by a predetermined distance in the longitudinal direction of the pressure transmission member 36 according to the writing pressure applied to the central rod 7. In this manner, the central rod 7 is detachably attached to the electronic pen main body part 3 via the pressure transmission member 36, and the writing pressure applied to the central rod 7 can be transmitted to the writing pressure detection part 6.

The cylindrical part 33 further houses a printed-circuit board 34. The printed-circuit board 34 carries a capacitor 35 connected in parallel with the coil 31 to form a resonance circuit. The variable capacitance capacitor constituted by the writing pressure detection part 6 is connected in parallel with the capacitor 35 on the printed-circuit board 34 to form part of the above-mentioned resonance circuit.

The electronic pen 1 of this embodiment is connected by electromagnetic induction with a loop coil of a position detection sensor of the position detection device by means of the resonance circuit. The electronic pen 1 exchanges signals interactively with the loop coil. The position detection device detects the position pointed to by the electronic pen 1 by detecting the position of the signal received on the position detection sensor from the electronic pen 1. Also, the position detection device detects the writing pressure applied to the electronic pen 1 by detecting changes in frequency or phase of the signal received from the electronic pen 1.

As depicted in FIG. 2B, the coil unwound part of the ferrite core 32 on the opposite side of the pen tip side is fitted into a recessed part 33a of the cylindrical part 33. The ferrite core 32 accordingly is coupled with the cylindrical part 33. Although not illustrated, when the ferrite core 32 is coupled with the cylindrical part 33, two ends 31a and 31b of the coil 31 are electrically connected in parallel with the capacitor 35 disposed on the printed-circuit board 34 in the cylindrical part 33.

First Configuration Example of the Electronic Pen Central Rod 7

FIGS. 3A to 3F are views each explaining a configuration example of the central rod 7 attached to the electronic pen main body part 3. As depicted in the external view of FIG. 3A, the central rod 7 is configured with the front-end member 71, connection member 72, and the back-end member 73. The front-end member 71 and the back-end member 73 are each made of resin, synthetic rubber, or natural rubber, for example. In this embodiment, these components are made of polyacetal resin (generally called POM). The front-end member 71 can be formed with a textile material such as a felt (non-woven fabric) so as to soften the writing feel. The connection member 72 is made of a high-hardness material such as metal or hard resin to increase the strength of the central rod 7. In this embodiment, the connection member 72 is made of stainless steel (generally called SUS).

Figure 3B:
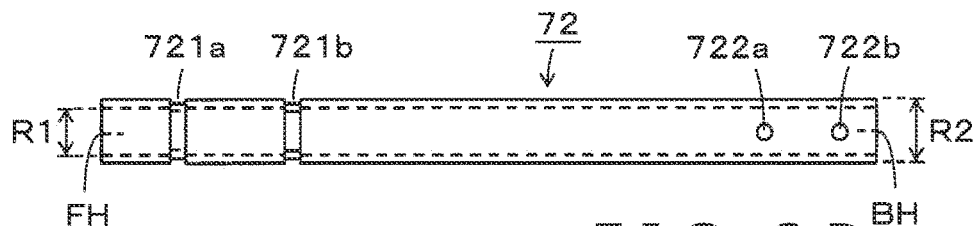

As depicted in FIG. 3B, the connection member 72 is a hollow (through-hole) cylindrical (pipe-like) member with an inner diameter of R1 and an outer diameter of R2. The through-hole 32a of the ferrite core 32 through which the central rod 7 is inserted as explained above with reference to FIG. 2A has a diameter r1 of 1 mm, for example. It follows that the outer diameter R2 is 1 mm or less to permit insertion into the through-hole 32a. In the case of this example, a portion of the connection member 72 toward the side of the front-end member 71 (left end side in FIG. 3B) forms a front-end hole part FH to which the front-end member 71 is fitted; a portion of the connection member 72 toward the side of the back-end member 73 (right side in FIG. 3B) constitutes a back-end hole part BH to which the back-end member 73 is fitted.

Furthermore, the connection member 72 has ring-shaped recessed parts 721a and 721b which are pressed down along the outer circumference toward the side of the front-end member 71 (left end side in FIG. 3B). Consequently, ring-shaped protruding parts 721c and 721d are formed to protrude internally from those positions on the inner wall surface (inner side surface) which correspond to the ring-shaped recessed parts 721a and 721b of the connection member 72. These ring-shaped protruding parts 721c and 721d function as a front-end holding part.

Through-holes 722a and 722b are formed in a direction intersecting with an axial center direction on the side surface (side wall) of the connection member 72 toward the side of the back-end member 73 (right side in FIG. 3B). Further, although not depicted in FIGS. 3A and 3B, through-holes 722c and 722d are formed in a direction intersecting with the axial center direction on the side surface (side wall) of the connection member 72 at the positions opposite from the through-holes 722a and 722b across a hollow space inside. That is, on the side surface of the connection member 72, the through-hole 722c is formed in a position opposite to the through-hole 722a across the internal hollow space, and the through-hole 722d is disposed in a position opposite to the through-hole 722b across the internal hollow space. There are thus formed four through-holes 722a, 722b, 722c, and 722d. These four through-holes 722a, 722b, 722c, and 722d, together with protruding parts formed on the back-end member 73 to be discussed later, function as a back-end holding part.

Figure 3C:
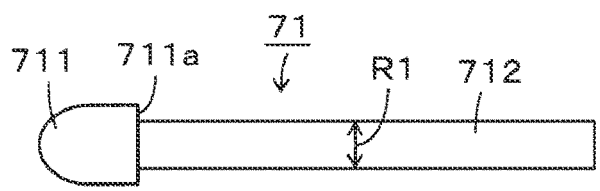

As depicted in FIG. 3C, the front-end member 71 is a rod-like body that includes a pen tip part 711 with its appearance shaped like a dome, and includes a back-end extension part 712 extending from a back-end face 711a of the pen tip part 711 in an opposite direction from the pen tip part 711. The back-end face 711a of the pen tip part 711 has a diameter slightly larger than the outer diameter R2 of the connection member 72. In this embodiment, the back-end extension part 712 of the front-end member 71 has a cylindrical shape with the diameter R1.

Figure 3D:
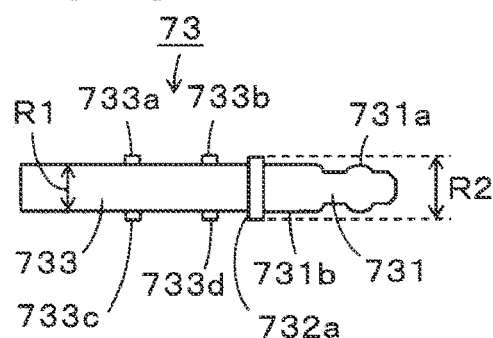
Figure 3E:
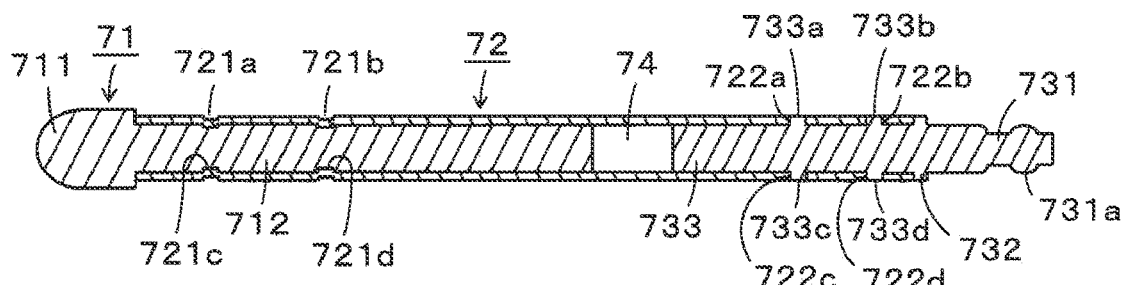
Figure 3F:
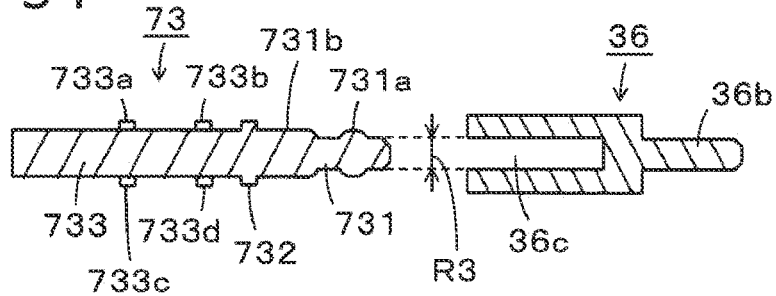

As depicted in the cross-sectional view of the central rod 7 in FIG. 3E, the front-end member 71 shaped as described above is press-inserted into the front-end hole part FH of the connection member 72, from the back-end side of the back-end extension part 712 through the opening on the left end side of the connection member 72. In this manner, the front-end member 71 is attached to the connection member 72. In this case, the back-end face of the pen tip part 711 of the front-end member 71 is butted against the front-end face (left end face) of the connection member 72. This prevents the front-end member 71 from further entering into the connection member 72. Furthermore, the ring-shaped protruding parts 721c and 721d formed on the inner wall surface of the connection member 72 function as a front-end holding part. This brings about a state in which the side surface of the back-end extension part 712 of the front-end member 71 is held down. The front-end member 71 can thus be attached to the connection member 72 with a constant level of holding strength. The back-end extension part 712 can have a diameter close to the length R1 as long as the back-end extension part 712 can be inserted through the opening on the left end side of the connection member 72. However, it is not desirable to make the diameter of the back-end extension part 712 unnecessarily smaller than the length R1 because this causes the back-end extension part 712 to be easily detached or dislodged.

As depicted in FIG. 3D, the back-end member 73 is a rod-like body that includes an attachment part 731 to be detachably attached to the electronic pen main body part 3, an engagement part 732, and a front-end extension part 733 extending from a front-end face 732a of the engagement part 732 in an opposite direction from the attachment part 731. The attachment part 731 and the front-end extension part 733 of the back-end member 73 are both cylindrically shaped and disposed on both sides of the engagement part 732. The engagement part 732, shaped as a circular plate with a predetermined thickness, separates the attachment part 731 and the front-end extension part 733 from each other. The attachment part 731 of the back-end member 73 has fitting protrusions 731a and 731b as depicted in FIG. 3D.

Meanwhile, as depicted in FIG. 3D, the front-end extension part 733 has protruding parts 733a and 733b positioned opposite from protruding parts 733c and 733d respectively, with a main body portion of the front-end extension part 733 interposed therebetween. The protruding parts 733a and 733b of the front-end extension part 733 are positioned corresponding to the through-holes 722a and 722b of the connection member 72, respectively. The protruding parts 733c and 733d are positioned corresponding to the through-holes 722c and 722d of the connection member 72, respectively. The main body portion of the front-end extension part 733 has the diameter R1 as depicted in FIG. 3D.

As depicted in the cross-sectional view of the central rod 7 in FIG. 3E, the back-end member 73 is inserted into the back-end hole part BH of the connection member 72 through the opening on the right end side of the connection member 72 from the front-end side of the front-end extension part 733. In this manner, the back-end member 73 is attached to the connection member 72. In this case, the members are aligned in such a manner that the protruding parts 733a and 733b of the front-end extension part 733 are fitted into the through-holes 722a and 722b of the connection member 72, respectively, and that the protruding parts 733c and 733d of the front-end extension part 733 are fitted into the through-holes 722c and 722d of the connection member 72, respectively. This is how the back-end member 73 is securely attached to the connection member 72. With the front-end face of the engagement part 732 butted against the back-end face of the connection member 72, the back-end member 73 is prevented from further entering into the connection member 72.

For the purpose of simplification, the protruding parts 733a through 733d are explained specifically to correspond to the through-holes 722a and 722d, respectively. However, given that the protruding parts 733a and 733b are located opposite from the protruding parts 733c and 733d and that the through-holes 722a and 722b are also located opposite from the protruding parts 733c and 733d, it is possible to fit the protruding parts 733a through 733b into the through-holes 722c and 722d and the protruding parts 733c and 733d into the through-holes 722a and 722b with the same effect in attaching the members.

Obviously, it is possible to detach the back-end member 73 from the connection member 72. In this case, the back-end member 73 is axially rotated relative to the connection member 72 or forcibly extracted therefrom in a manner to detach or dislodge the protruding parts 733a, 733b, 733c, and 733d from the through-holes 722a, 722b, 722c, and 722d of the connection member 72. The front-end extension part 733 can have a diameter close to the length R1 as long as the front-end extension part 733 can be inserted through the opening on the right end side of the connection member 72. However, it is not desirable to make the diameter of the front-end extension part 733 unnecessarily smaller than the length R1 because this causes the front-end extension part 733 to be easily detached or dislodged.

Meanwhile, as explained above with reference to FIGS. 2A and 2B, the attachment part 731 of the back-end member 73 is fitted into the fitting recessed part 36a of the pressure transmission member 36 inside the electronic pen main body part 3. The fitting protrusions 731a and 731b come into strong contact with the inner wall surface of the fitting recessed part 36a. That is, as depicted in the cross-sectional view of the back-end member 73 and the pressure transmission member 36 in FIG. 3F, the attachment part 731 excluding the fitting protrusions 731a and 731b has a length R3, which is the same as the diameter of the fitting recessed part 36a of the pressure transmission member 36.

Thus, the attachment part 731 of the back-end member 73 has its front end press-inserted and fitted into the fitting recessed part 36a of the pressure transmission member 36. In this case, the fitting protrusions 731a and 731b come into strong contact with the inner wall surface of the fitting recessed part 36a. The fitting protrusions 731a and 731b and the inner wall surface of the fitting recessed part 36a are engaged with one another with a predetermined level of holding strength, allowing the central rod 7 to be attached to the pressure transmission member 36. With the central rod 7 thus attached to the pressure transmission member 36, the writing pressure applied to the central rod 7 pushes up the pressure transmission member 36. In turn, a pressing part 36b of the pressure transmission member 36 presses the writing pressure detection part 6. When the writing pressure to the central rod 7 is released, the pressure transmission member 36 and the central rod 7 are pushed back and return to their initial positions.

In this embodiment, the connecting portion between the connection member 72 and the front-end extension part 733 of the back-end member 73 has the highest holding strength when the through-holes 722a et al. and the protruding parts 733a et al. are fitted to one another. This ensures hard-to-detach connection between the connection member 72 and the back-end member 73. The connecting portion between the attachment part 731 of the back-end member 73 and the pressure transmission member 36 has the second-highest holding strength with a wide area of contact formed between the fitting protrusions 731a and 731b on one hand, and the inner wall surface of the fitting recessed part 36a of the pressure transmission member 36 on the other hand. The connecting portion between the connection member 72 and the back-end extension part 712 of the front-end member 71 has the third-highest holding strength because of a relatively small portion of contact between the ring-shaped protruding parts 721c and 721d on the inner wall surface of the connection member 72 on one hand, and the back-end extension part 712 on the other hand.

There are three types of holding strength: the holding strength with which the connection member 72 holds the back-end extension part 712 of the front-end member 71; the holding strength with which the connection member 72 holds the front-end extension part 733 of the back-end member 73; and the holding strength with which the pressure transmission member 36 holds the attachment part 731 of the back-end member 73. Specifically, the holding strength means a strength high enough for members to maintain their connected state by means of frictional force of the connecting portion between the members, or by use of engaging force of (force to engage with) through-holes or recesses and projections formed over the connecting portion between the members.

For this embodiment, it is assumed that a value A stands for the holding strength of the connecting portion between the connection member 72 and the front-end extension part 733 of the back-end member 73, that a value B denotes the holding strength of the connecting portion between the attachment part 731 of the back-end member 73 and the pressure transmission member 36, and that a value C represents the holding strength of the connecting portion between the connection member 72 and the back-end extension part 712 of the front-end member 71. In a case where the central rod 7 depicted in FIGS. 3A to 3F is used, the relations between these types of holding strength are A>B>C. That is, the connecting portion between the connection member 72 and the front-end extension part 733 of the back-end member 73 has the highest holding strength; the connecting portion between the attachment part 731 of the back-end member 73 and the pressure transmission member 36 has the second-highest holding strength; and the connecting portion between the connection member 72 and the back-end extension part 712 of the front-end member 71 has the third-highest holding strength.

Thus, when the central rod 7 is thus attached to the electronic pen main body part 3, the central rod 7 can be pulled, by a user pinching the pen tip part 711 of the front-end member 71 with nails, for example, and pulling the central rod 7 with a force that is lower than the holding strength B but greater than the holding strength C. In such case, while the attachment part 731 of the back-end member 73 of the central rod 7 remains attached to the pressure transmission member 36, the front-end member 71 can be extracted (separated) from the connection member 72. That is, with the central rod 7 attached to the electronic pen main body part 3, the front-end member 71 alone can be replaced. Because the back-end extension part 712 of the front-end member 71 is relatively long, the front-end member 71 can be extracted from the connection member 72, for example, by repeatedly pulling the central rod 7, each time for a short period of time with a force that is greater than the holding strength C.

With the central rod 7 attached to the electronic pen main body part 3, the central rod 7 can be pulled, by a user holding the pen tip part 711 of the front-end member 71 with nails, for example, and pulling the central rod 7 with a force that is lower than the holding strength A and higher than the holding strength B. In this case, because the back-end extension part 712 of the front-end member 71 is long, the entire central rod 7 can be extracted from the electronic pen main body part 3 before the front-end member 71 is extracted out of the connection member 72. That is, the central rod 7 as a whole can be replaced, as needed.

As depicted in FIG. 3E, a void space 74 is provided between the back-end face of the back-end extension part 712 of the front-end member 71 and the front-end face of the front-end extension part 733 of the back-end member 73. However, the presence of the void space 74 is not always required. Either of or both of the back-end extension part 712 of the front-end member 71 and the front-end extension part 733 of the back-end member 73 may be elongated to make the void space 74 as narrow as possible, which will enhance the strength of the central rod 7.

Second Configuration Example of the Electronic Pen Central Rod 7

FIGS. 4A to 4F are views each explaining a central rod 7A as another configuration example of the central rod 7 to be attached to the electronic pen main body part 3. Of the components of the central rod 7A in FIGS. 4A to 4F, those configured substantially the same as their counterparts of the central rod 7 in FIGS. 3A to 3F are designated by the same reference signs. As depicted in the external view of FIG. 4A, the central rod 7A of this example is configured with a front-end member 71, a connection member 72A, and a back-end member 73A. That is, the members making up the central rod 7A are similar to the three types of members in the case of the central rod 7 explained above with reference to FIGS. 3A to 3F, except that the connection member 72A and the back-end member 73A are configured differently from the connection member 72 and the back-end member 73 of the central rod 7 in FIGS. 3A to 3F. With the central rod 7A of the present example, the front-end member 71, the connection member 72A, and the back-end member 73 are made of the same materials as those of the corresponding members of the central rod 7 explained above with reference to FIGS. 3A to 3F.

Figure 4A:
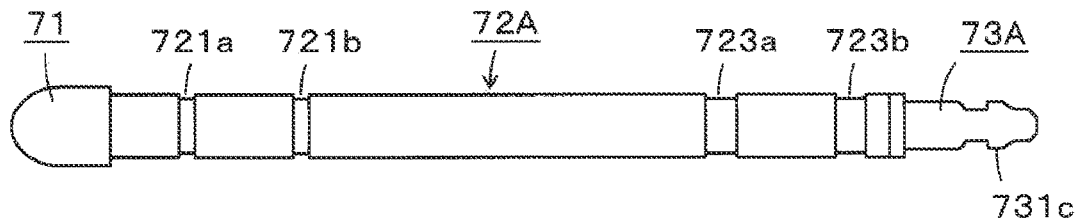
FIGS. 4A to 4F are views each explaining another configuration example of the electronic pen central rod according to the present disclosure.
Figure 4B:
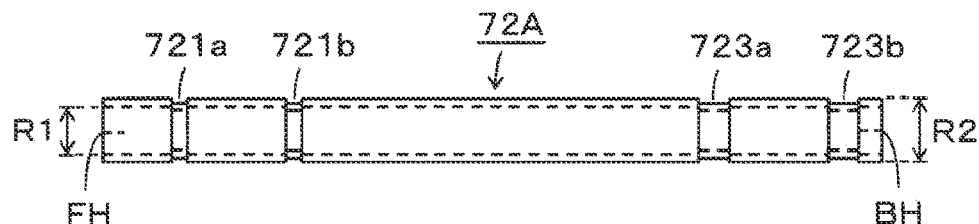

With the central rod 7A of this example, as depicted in FIG. 4B, the connection member 72A is also a pipe-like (cylindrical) member with a hollow interior. The connection member 72A has inner diameter R1 and outer diameter R2, which are the same as those of the connection member 72 in FIG. 3B. In this example as well, a portion of the connection member 72A on the side toward the front-end member 71 (on the left end side in FIG. 4B) forms a front-end hole part FH to which the front-end member 71 is fitted; and a portion of the connection member 72A toward the side of the back-end member 73A (on the right end side in FIG. 4B) constitutes a back-end hole part BH to which the back-end member 73A is fitted.

Also, the connection member 72A in FIG. 4B has ring-shaped recessed parts 721a and 721b which are pressed down along the outer circumference toward the side of the front-end member 71 (on the left end side in FIG. 4B). Consequently, ring-shaped protruding parts 721c and 721d are formed to protrude internally from those positions of the inner wall surface (inner side surface) which correspond to the ring-shaped recessed parts 721a and 721b of the connection member 72A. These ring-shaped protruding parts 721c and 721d function as a front-end holding part.

Further, the connection member 72A of this example has ring-shaped recessed parts 723a and 723b which are pressed down along the outer circumference toward the side of the back-end member 73A (right end side in FIG. 4B). Consequently, ring-shaped protruding parts 723c and 723d are formed to protrude internally from those positions of the inner wall surface (inner side surface) which correspond to the ring-shaped recessed parts 723*a* and 723*b* of the connection member 72A. The ring-shaped protruding parts 723*c* and 723*d* function as a back-end holding part. As depicted in FIG. 4B, the ring-shaped recessed parts 723*a* and 723*b* toward the side of the back-end member 73A are wider in the longitudinal direction than the ring-shaped recessed parts 721*a* and 721*b* on the side of the front-end member 71.

Figure 4C:
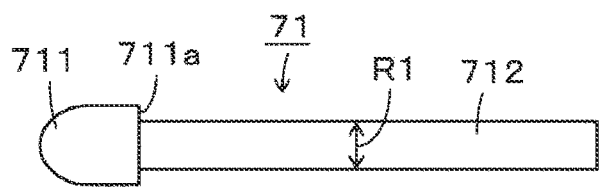

As depicted in FIG. 4C, the front-end member 71 is configured similarly to the front-end member 71 explained above with reference to FIG. 3C and thus will not be discussed further in detail to avoid duplication. As depicted in the cross-sectional view of the central rod 7A in FIG. 4E, the front-end member 71 is press-inserted into the front-end hole part FH of the connection member 72A through the opening on the left end side of the connection member 72A, from the back-end side of the back-end extension part 712. This allows the front-end member 71 to be attached to the connection member 72A in a manner similar to that of the central rod 7 explained above with reference to FIGS. 3A to 3F. That is, the ring-shaped protruding parts 721*c* and 721*d* formed on the inner wall surface of the connection member 72A function as a front-end holding part. This brings about a state in which the side surface of the back-end extension part 712 of the front-end member 71 is held down. The front-end member 71 can thus be attached to the connection member 72A with a constant level of holding strength.

In this case, the back-end face of the pen tip part 711 of the front-end member 71 and the front-end face (left end side) of the connection member 72A are butted against each other. This prevents the front-end member 71 from further entering into the connection member 72. As in the case of the central rod 7 in FIGS. 3A to 3F, the back-end extension part 712 of the front-end member 71 can have a diameter close to the length R1 as long as the back-end extension part 712 can be inserted through the opening on the left end side of the connection member 72A. However, it is not desirable to make the diameter of the back-end extension part 712 unnecessarily smaller than the length R1 because this may cause the back-end extension part 712 to be easily detached or dislodged.

Figure 4D:
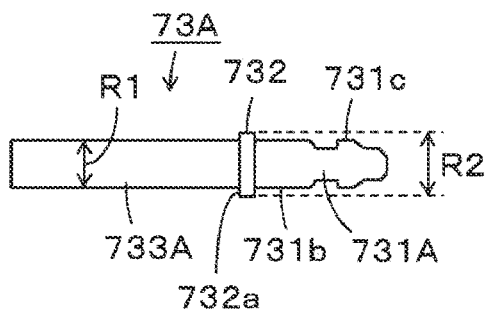

As depicted in FIG. 4D, the back-end member 73A is a rod-like body that includes an attachment part 731A to be detachably attached to the electronic pen main body part 3, an engagement part 732, and a front-end extension part 733A extending from the front-end face 732*a* of the engagement part 732 in the opposite direction from the attachment part 731A. The attachment part 731A and the front-end extension part 733A of the back-end member 73A are both cylindrically shaped and disposed on both sides of the engagement part 732. The engagement part 732, shaped as a circular plate with a predetermined thickness, separates the attachment part 731A and the front-end extension part 733A from each other. The attachment part 731A of the back-end member 73A has fitting protrusions 731*c* and 731*b* as depicted in FIG. 4D. The fitting protrusion 731*c* is shaped differently from the fitting protrusion 731*a* of the attachment part 731 of the back-end member 73 depicted in FIGS. 3A to 3F.

Meanwhile, the front-end extension part 733A as depicted in FIG. 4D has a simple cylindrical shape with no protrusions thereon, differently from the front-end extension part 733 of the back-end member 73 of the central rod 7 in FIG. 3D. In this example also, the front-end extension part 733A of the back-end member 73A has the diameter R1 as depicted in FIG. 4D. As illustrated in the cross-sectional view of the central rod 7A in FIG. 4E, the back-end member 73A is attached to the connection member 72A when press-inserted into the back-end hole part BH of the connection member 72A, from the front-end side of the front-end extension part 733A, through the opening on the right end side of the connection member 72A. In this case, the front-end face of the engagement part 732 of the back-end member 73A and the back-end face (right end face) of the connection member 72A are butted against each other. This prevents the back-end member 73A from further entering into the connection member 72A.

Figure 4E:
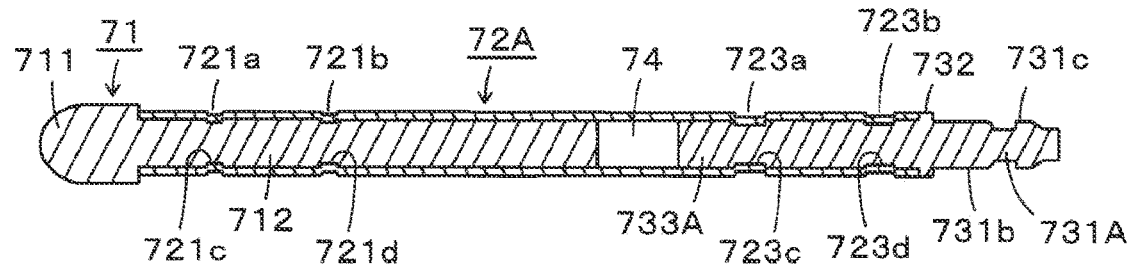

Further, the ring-shaped protruding parts 723*c* and 723*d* formed on the inner wall surface of the connection member 72A function as a back-end holding part that holds down the side surface of the front-end extension part 733A of the back-end member 73A. The back-end member 73A can thus be attached to the connection member 72A with a constant level of holding strength. In this case, as can be seen in FIG. 4E, the ring-shaped protruding parts 723*c* and 723*d* of the connection member 72A toward the side of the back-end member 73A are wider in the longitudinal direction than the ring-shaped protruding parts 721*c* and 721*d* of the connection member 72A toward the side of the front-end member 71. Consequently, the connection member 72A can hold the back-end member 73A with higher holding strength than the front-end member 71. In this example as well, the front-end face of the engagement part 732 is butted against the back-end face of the connection member 72A. This prevents the back-end member 73A from further entering into the connection member 72A.

Meanwhile, the attachment part 731A of the back-end member 73A is fitted to a fitting recessed part 36*c* of a pressure transmission member 36A inside the electronic pen main body part 3. The attachment part 731A has fitting protrusions 731*c* and 731*b* formed thereon. The fitting recessed part 36*c* of the pressure transmission member 36A in this example has an engagement part 36*cx* that engages with the fitting protrusion 731*c* of the attachment part 731A of the back-end member 73A as depicted in FIG. 4F, differently from the fitting recessed part 36*a* of the pressure transmission member 36 explained above with reference to FIGS. 3A to 3F.

Figure 4F:
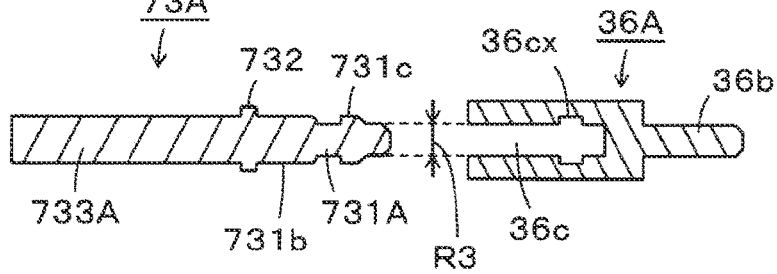

That is, as depicted in the cross-sectional view of the back-end member 73A and the pressure transmission member 36A in FIG. 4F, the attachment part 731A excluding the fitting protrusions 731*a* and 731*b* has the diameter R3, which is the same as that of the fitting recessed part 36*c* of the pressure transmission member 36A. Thus, the attachment part 731A of the back-end member 73A has its front end press-inserted and fitted into the fitting recessed part 36*c* of the pressure transmission member 36A.

In this example, the fitting protrusion 731*c* of the attachment part 731A of the back-end member 73A is engaged with the engagement part 36*cx* of the fitting recessed part 36*c* of the pressure transmission member 36A. The engagement causes the fitting protrusion 731*b* of the attachment part 731A to come into strong contact with the inner wall surface of the fitting recessed part 36*c*. The contact allows the pressure transmission member 36A to hold the attachment part 731A with a predetermined level of holding strength. This in turn allows the central rod 7A to be attached to the pressure transmission member 36A with a predetermined level of holding strength.

In this example as well, in the connecting portion between the connection member 72A and the front-end extension part 733A of the back-end member 73A, the ring-shaped protruding parts 723*c* and 723*d* of the connection member 72A strongly hold down the circumference of the front-end extension part 733A. This ensures hard-to-detach connection between the connection member 72A and the back-end member 73A. In the connecting portion between the attachment part 731A of the back-end member 73A and the pressure transmission member 36A, the fitting protrusion 731c and the engagement part 36cx are fitted to each other, with a wide area of contact made between the fitting protrusion 731b and the inner wall surface of the fitting recessed part 36c of the pressure transmission member 36A to ensure the hold. Whereas the connecting portion between the connection member 72A and the back-end extension part 712 of the front-end member 71 provides a relatively small area of contact between the ring-shaped protruding parts 721c and 721d on the inner wall surface of the connection member 72A and the back-end extension part 712, the components are held in place with a predetermined level of holding strength.

As described above, the holding strength signifies a strength (force) high enough for members to maintain their connected state by means of frictional force of the connecting portion between the members, or by use of engaging force of (force to engage with) through-holes or recesses and projections formed over the connecting portion between the members. In this example as well, it is assumed that the value A stands for the holding strength of the connecting portion between the connection member 72A and the front-end extension part 733A of the back-end member 73A, that the value B denotes the holding strength of the connecting portion between the attachment part 731A of the back-end member 73A and the pressure transmission member 36A, and that the value C represents the holding strength of the connecting portion between the connection member 72A and the back-end extension part 712 of the front-end member 71.

In a case where the central rod 7A depicted in FIGS. 4A to 4F is adopted, the relations between these types of holding strength are also A>B>C. That is, the connecting portion between the connection member 72A and the front-end extension part 733A of the back-end member 73A has the highest holding strength; the connecting portion between the attachment part 731A of the back-end member 73A and the pressure transmission member 36A has the second-highest holding strength; and the connecting portion between the connection member 72A and the back-end extension part 712 of the front-end member 71 has the third-highest holding strength.

Thus, when the central rod 7A is thus attached to the electronic pen main body part 3, the central rod 7A can be pulled by a user pinching the pen tip part 711 of the front-end member 71 with nails to pull the central rod 7A with a force that is lower than the holding strength B but greater than the holding strength C. In this case, while the attachment part 731A of the back-end member 73A of the central rod 7A remains attached to the pressure transmission member 36A, the front-end member 71 can be extracted (separated) from the connection member 72A. That is, with the central rod 7A attached to the electronic pen main body part 3, the front-end member 71 alone can be replaced. Because the back-end extension part 712 of the front-end member 71 is relatively long, the front-end member 71 can be extracted from the connection member 72A, for example, by repeatedly pulling the central rod 7A, each time for a short period of time with a force that is greater than the holding strength C.

Likewise, suppose that the central rod 7A of this example is attached to the electronic pen main body part 3. In this case, the user may pinch the pen tip part 711 of the front-end member 71 with nails, for example, to pull the central rod 7A with a force smaller than the holding strength A and higher than the holding strength B. This allows the central rod 7A as a whole to be extracted from the electronic pen main body part 3. That is, the entire central rod 7A attached to the electronic pen main body part 3 can be replaced.

The strength of the central rod 7A can further be increased when either or both of the back-end extension part 712 of the front-end member 71 and the front-end extension part 733A of the back-end member 73A is elongated to make the void space 74 in FIG. 4E as narrow as possible.

Advantageous Effects of the Embodiment

The central rod 7 or 7A of this embodiment is made as a high-strength central rod, using the stainless connection member 72 or 72A. The central rod is securely attached to the connection member 72 by press-inserting the front-end member 71 and the back-end member 73 into the connection member 72, or is firmly attached to the connection member 72A by press-inserting the front-end member 71 and the back-end member 73A into the connection member 72A. The attachment can thus withstand rough usages such as writing for a long period of time or writing with high writing pressure.

Neither of the front-end member 71 or the back-end member 73 is adhered to the connection member 72, and neither of the front-end member 71 or the back-end member 73A is adhered to the connection member 72A. This simplifies the manufacturing process, and provides the central rod 7 or 7A for which the front-end member 71 serving as the pen tip can be easily replaced.

In the case of the central rod 7, the holding strength is the highest for the connecting portion between the connection member 72 and the back-end member 73, the second-highest for the connecting portion between the back-end member 73 and the pressure transmission member 36, and the third-highest for the connecting portion between the connection member 72 and the front-end member 71. Likewise, in the case of the central rod 7A, the holding strength is the highest for the connecting portion between the connection member 72A and the back-end member 73A, the second-highest for the connecting portion between the back-end member 73A and the pressure transmission member 36A, and the third-highest for the connecting portion between the connection member 72A and the front-end member 71. Thus, with the central rod 7 or 7A attached to the electronic pen main body part 3 via the pressure transmission member 36 or 36A, only the front-end member 71 held by the connection member 72 or 72A can be pulled out for replacement.

It is therefore possible to replace the front-end member 71 without extracting the central rod 7 or 7A from the pressure transmission member 36 or 36A for every replacement. The replacement in this fashion prevents the fitting recessed part 36a or 36c of the pressure transmission member 36 or 36A from being subjected to heavy load (wear and tear). This makes it possible to achieve a central rod having a high affinity with the electronic pen main body part 3, to which the central rod 7 or 7A can be detachably attached via the pressure transmission member 36 or 36A.

Alternative Examples

In the case of the central rod 7 explained above with reference to FIGS. 3A to 3F, the ring-shaped protruding parts 721c and 721d are formed on the inner wall surface of the connection member 72 toward the side of the front-end member 71. The ring-shaped protruding parts 721c and 721d can have an appropriate width large enough to ensure necessary holding strength. Whereas two ring-shaped protruding parts 721c and 721d are provided, there may be a single ring-shaped protruding part or three or more ring-shaped protruding parts, as long as these parts ensure necessary holding strength. That is, the width and the number of ring-shaped protruding parts to be formed on the inner wall surface of the connection member 72 on the front-end member side may be varied such that these parts ensure necessary holding strength. Likewise, in the case of the central rod 7A explained above with reference to FIGS. 4A to 4F, the ring-shaped protruding parts formed on the inner wall surface of the connection member 72A (i.e., ring-shaped protruding parts 721c, 721d, 723c, and 723d in FIG. 4E) can be varied in width and number as long as these parts provide necessary holding strength.

Figure 5:
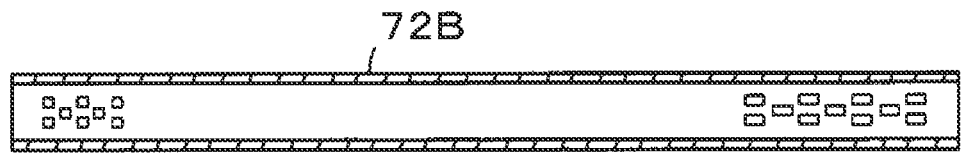
FIG. 5 is a view explaining a further configuration example of the electronic pen central rod according to the present disclosure.

The protruding parts formed on the inner wall surface of the connection member 72 or 72A are not limited to the ring-shaped type. FIG. 5 is a diagram explaining an alternative example of the central rod 7 or 7A. FIG. 5 depicts a connection member 72B, which is cut in half along its longitudinal direction with its frontal half removed. As depicted in FIG. 5, protruding parts of suitable shapes and sizes may be formed on the inner wall surface of the connection member 72B in place of the ring-shaped protruding parts 721c, 721d, 723c, and 723d. That is, the protruding parts may be provided in diverse shapes, sizes, and locations. In such cases, there is no need to change the configuration of the front-end member 71 and back-end member 73A.

Recessed parts can be formed on the side surface of the front-end member 71 and back-end member 73A in a manner corresponding to the protruding parts provided on the inner wall surface of the connection member 72 or 72A such that the protruding parts and the recessed parts are fitted to each other. This technique may be effective when the front-end member 71 and the back-end member 73A each has a diameter large enough so as to maintain its structural strength. In other words, the members that constitute the central rod 7 or 7A can be adjusted in diameter and length according to the size of the electronic pen main body part for which these members are used.

In the case of the central rod 7 explained above with reference to FIGS. 3A to 3F, the through-holes 722a, 722b, 722c, and 722d are formed on the side surface of the connection member 72 toward the side of the back-end member 73 in a direction intersecting with the axial center direction. In correspondence to these through-holes, the protruding parts 733a, 733b, 733c, and 733d are formed on the front-end extension part 733 of the back-end member 73. However, the present disclosure is not limited to these specific examples. Alternatively, through-holes of suitable sizes and numbers can be formed in appropriate locations on the connection member 72 toward the side of the back-end member 73. In correspondence to these through-holes on the connection member 72 toward the side of the back-end member 73, there may be provided fitting protrusions of the corresponding sizes and numbers on the front-end extension part 733 of the back-end number 73.

Figure 6A:
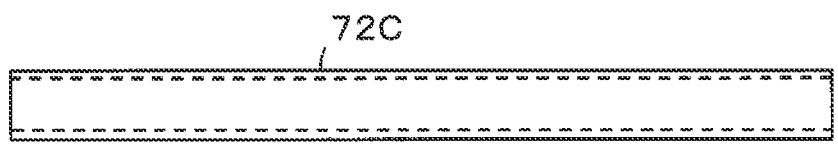
FIGS. 6A to 6C are views each explaining an even further configuration example of the electronic pen central rod according to the present disclosure.
Figure 6B:
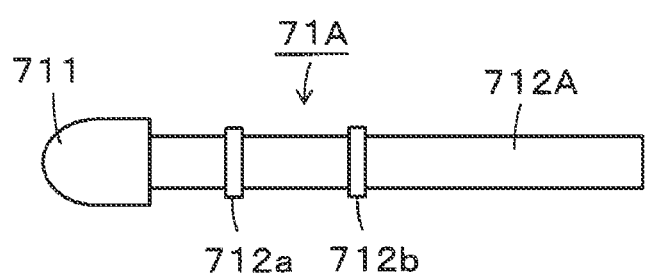
Figure 6C:
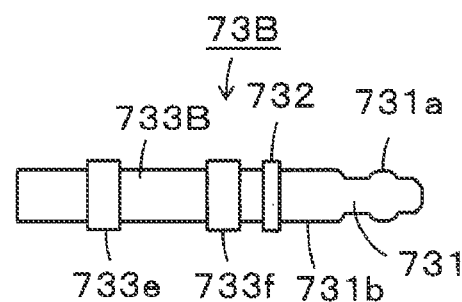

With the central rod 7 depicted in FIGS. 3A to 3F, the ring-shaped protruding parts 721c and 721d are formed on the connection member 72 toward the side of the front-end member 71. With the central rod 7A depicted in FIGS. 4A to 4F, the ring-shaped protruding parts 723c and 723d are provided on the connection member 72A toward the side of the back-end member 73A. However, the present disclosure is not limited to these specific examples. Alternatively, these members on which the protruding parts are formed may be reversed in position. FIGS. 6A to 6C are diagrams each explaining another alternative example of the central rod 7 or 7A. As depicted in FIG. 6A, a connection member 72C is assumed to be a cylindrical (pipe-like) member with no protruding parts on its inner wall surface.

In contrast, ring-shaped protruding parts 712a and 712b are formed on a back-end extension part 712A of the front-end member 71 as depicted in FIG. 6B. Ring-shaped protruding parts 733e and 733f are formed on a front-end extension part 733B of a back-end member 73B as illustrated in FIG. 6C. Given these protruding parts, when the front-end member 71A and the back-end member 73B are press-inserted into the connection member 72C, the connection member 72C holds the front-end member 71A and the back-end member 73B with a predetermined level of holding strength.

In this case as well, there can be provided ring-shaped protruding parts of suitable sizes and numbers on the front-end member 71A and back-end member 73B in order to attain a predetermined level of holding strength. Furthermore, the ring-shaped protruding parts are not limited to be formed on the front-end member 71A and the back-end member 73B. In a manner similar to the case explained above with reference to FIG. 5, there can also be provided protruding parts of desired shapes, sizes, and numbers on the side surface of the back-end extension part 712A of the front-end member 71A and on the side surface of the front-end extension part 733B of the back-end member 73B. In the case of the alternative example depicted in FIGS. 6A to 6C, there may be provided recessed parts on the inner wall surface of the connection member 72C in a manner corresponding to the protruding parts formed on the side surface of the back-end extension part 712A of the front-end member 71A and on the side surface of the front-end extension part 733B of the back-end member 73B.

Figure 7:
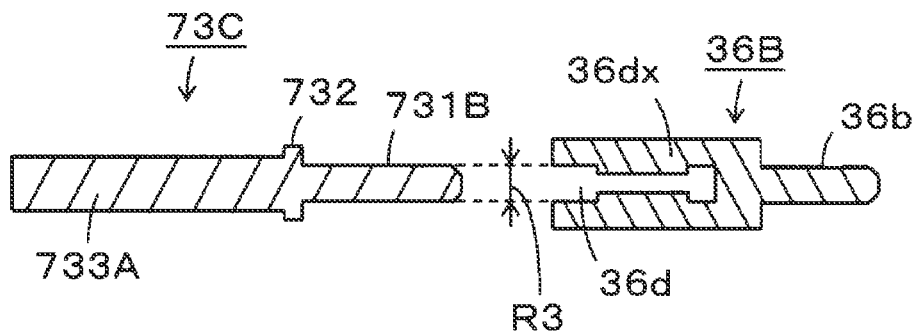
FIG. 7 is a view explaining a still further configuration example of the electronic pen central rod according to the present disclosure.

Also, the relations between the back-end member and the pressure transmission part in the cases depicted in FIGS. 3A to 3F and 4A to 4F can be reversed. FIG. 7 is a diagram explaining another alternative example of the central rod 7 or 7A. In the case of this example, an attachment part 731B of a back-end member 73C is configured not to have protrusions (protruding parts) or grooves (recessed parts) formed thereon. In contrast, a ring-shaped protruding part 36dx is formed on the inner wall surface of a fitting recessed part 36d of the pressure transmission member 36. This enables the back-end member 73C to be attached to a pressure transmission member 36B with a predetermined level of holding strength. The width and height of the ring-shaped protruding part 36dx can be varied in a manner so as to achieve the desired level of holding strength.

Figure 8:
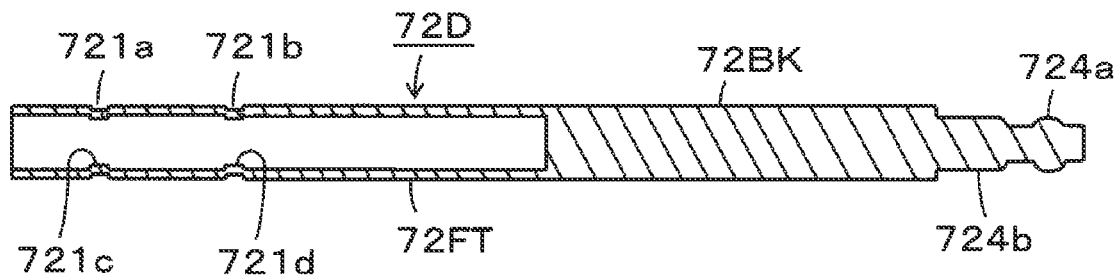
FIG. 8 is a view explaining another configuration example of a connection member of the electronic pen central rod according to the present disclosure.

It is not always necessary to detachably attach the connection member to the back-end member, e.g., the connection member 72 to the back-end member 73, the connection member 72A to the back-end member 73A, or the connection member 72 to the back-end member 73B. FIG. 8 is a diagram explaining another alternative example of the connection member. A connection member 72D depicted in FIG. 8 has the connection member and the back-end member that are integrally formed. As depicted in FIG. 8, the connection member 72D is made of a front-end pipe part 72FT and a back-end attachment part 72BK integrally formed. In this case, the back-end attachment part 72BK performs the function of the back-end member 73 or 73A in the above-described embodiment.

The front-end member 71 explained above with reference to FIGS. 3A to 3F and 4A to 4F can be attached to the connection member 72D. The front-end side of the connection member 72D may be configured to have such protrusions as those depicted in FIG. 5. It is also possible to configure the front-end pipe part 72FT of the connection member 72D to have neither protrusions nor recessed parts on the inner wall surface, as explained above with reference to FIG. 6A. In this case, the front-end member 71A depicted in FIG. 6B is to be attached. Also, the back-end attachment part 72BK can be configured as depicted in FIGS. 4A to 4F or in FIG. 7.

In the above-described embodiments, the central rod 7 or 7A is configured to apply pressure to the writing pressure detection part 6 via the pressure transmission member 36 or 36A. However, the present disclosure is not limited to these specific examples. In a case where the writing pressure detection part 6 is configured to have a mechanism to hold a central rod, the central rod 7 or 7A may be attached directly to the writing pressure detection part 6 such that the attachment part 731 or 731A may serve as a member (i.e., a pressing element) for pushing the writing pressure detection part 6.

Application to the Electronic Pen Operating Based on the Capacitance Method

The above embodiments have been explained in connection with examples of the electronic pen operating based on the electromagnetic induction method. Alternatively, the electronic pen central rod of this disclosure can also be applied to an electronic pen operating based on the capacitance method. In this case, the front-end member, the connection member, and the back-end member are all configured to be electrically conductive, so that the central rod as a whole may become electrically conductive. The electrical conductivity is achieved by using metal or resin mixed with metal powder as the raw materials for forming various members.

It is to be understood that while the invention has been described in conjunction with specific embodiments with reference to the accompanying drawings, it is evident that many alternatives, modifications, and variations will become apparent to those skilled in the art in light of the foregoing description. Accordingly, it is intended that the present invention embrace all such alternatives, modifications, and variations as fall within the spirit and scope of the appended claims.

The invention claimed is:

1. An electronic pen central rod, comprising:
a connection member having a front end and a back end;
a front-end member having a pen tip part and a back-end extension part that extends in an opposite direction from the pen tip part to be detachably held by the front end of the connection member with a first level of holding strength; and
a back-end member having an attachment part to be attached to an electronic pen interior and a front-end extension part that extends in an opposite direction from the attachment part to be held by the back end of the connection member with a second level of holding strength;
wherein the second level of holding strength is higher than the first level of holding strength.

2. The electronic pen central rod according to claim 1, wherein the front end of the connection member includes a front-end hole in which the back-end extension part of the front-end member is detachably inserted.

3. The electronic pen central rod according to claim 2, wherein a protrusion formed on an inner wall surface of the front-end hole is used to detachably hold the back-end extension part in the front-end hole.

4. The electronic pen central rod according to claim 2, wherein a protrusion formed on a side surface of the back-end extension part of the front-end member is used to detachably hold the back-end extension part in the front-end hole.

5. The electronic pen central rod according to claim 1, wherein the back end of the connection member includes a back-end hole in which the front-end extension part of the back-end member is inserted.

6. The electronic pen central rod according to claim 5, wherein a protrusion formed on an inner wall surface of the back-end hole is used to hold the front-end extension part in the back-end hole.

7. The electronic pen central rod according to claim 5, wherein a protrusion formed on a side surface of the front-end extension part of the back-end member is used to hold the front-end extension part in the back-end hole.

8. The electronic pen central rod according to claim 1, wherein the second level of holding strength between the back end of the connection member and the front-end extension part is highest, a third level of holding strength between the attachment part of the back-end member and the electronic pen interior is second-highest, and the first level of holding strength between the front end of the connection member and the back-end extension part is third-highest.

9. The electronic pen central rod according to claim 1, wherein the connection member is formed by a metal material.

10. The electronic pen central rod according to claim 1, wherein the front-end member is formed by a resin material.

11. The electronic pen central rod according to claim 1, wherein the front-end member is formed by a felt material.

12. The electronic pen central rod according to claim 1, wherein the back-end member is formed by a resin material.

13. An electronic pen central rod, comprising:
a connection member having a front end and a back end; and
a front-end member having a pen tip part and a back-end extension part that extends in an opposite direction from the pen tip part to be detachably held by the front end of the connection member with a first level of holding strength;
wherein the back end of the connection member is configured to be attached to an electronic pen interior.

14. The electronic pen central rod according to claim 13, wherein the front end of the connection member includes a front-end hole in which the back-end extension part of the front-end member is detachably inserted.

15. The electronic pen central rod according to claim 14, wherein a protrusion formed on an inner wall surface of the front-end hole is used to detachably hold the back-end extension part in the front-end hole.

16. The electronic pen central rod according to claim 14, wherein at least one ring-shaped protrusion formed on an inner wall surface of the front-end hole is used to detachably hold the back-end extension part in the front-end hole.

17. The electronic pen central rod according to claim 14, wherein a protrusion formed on a side surface of the back-end extension part of the front-end member is used to detachably hold the back-end extension part in the front-end hole.

18. The electronic pen central rod according to claim 13, wherein a second level of holding strength between the back end of the connection member and the electronic pen interior is higher than the first level of holding strength between the front end of the connection member and the back-end extension part.

19. The electronic pen central rod according to claim 13, wherein the front-end member is formed by a resin material and/or a felt material.

20. An electronic pen main body part, comprising:
a housing; and
a central rod axially extending through the housing, wherein the central rod includes
  a connection member having a front end and a back end;
  a front-end member having a pen tip part and a back-end extension part that extends in an opposite direction from the pen tip part to be detachably held by the front end of the connection member with a first level of holding strength; and
  a back-end member having an attachment part to be attached to an electronic pen interior and a front-end extension part that extends in an opposite direction from the attachment part to be held by the back end of the connection member with a second level of holding strength;
wherein the second level of holding strength is higher than the first level of holding strength.

* * * * *